United States Patent
Omura et al.

(10) Patent No.: US 12,195,816 B2
(45) Date of Patent: Jan. 14, 2025

(54) LINEAR GROOVE FORMATION METHOD AND LINEAR GROOVE FORMING APPARATUS, AND METHOD FOR MANUFACTURING GRAIN-ORIENTED ELECTRICAL STEEL SHEET

(71) Applicant: JFE Steel Corporation, Tokyo (JP)

(72) Inventors: Takeshi Omura, Tokyo (JP); Yoshihisa Ichihara, Tokyo (JP); Shigehiro Takajo, Tokyo (JP); Hirotaka Inoue, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 434 days.

(21) Appl. No.: 17/630,249

(22) PCT Filed: Jul. 3, 2020

(86) PCT No.: PCT/JP2020/026183
§ 371 (c)(1),
(2) Date: Jan. 26, 2022

(87) PCT Pub. No.: WO2021/020028
PCT Pub. Date: Feb. 4, 2021

(65) Prior Publication Data
US 2022/0282349 A1 Sep. 8, 2022

(30) Foreign Application Priority Data
Jul. 31, 2019 (JP) .................... 2019-140967

(51) Int. Cl.
*C21D 8/12* (2006.01)
*B23K 26/06* (2014.01)
(Continued)

(52) U.S. Cl.
CPC ........ *C21D 8/1294* (2013.01); *B23K 26/0604* (2013.01); *B23K 26/0661* (2013.01);
(Continued)

(58) Field of Classification Search
None
See application file for complete search history.

(56) References Cited

U.S. PATENT DOCUMENTS

| | | | |
|---|---|---|---|
| 2004/0118824 A1* | 6/2004 | Burgess | B23K 26/282 29/852 |
| 2004/0169023 A1* | 9/2004 | Tanaka | H01L 27/1285 219/121.76 |

(Continued)

FOREIGN PATENT DOCUMENTS

| | | |
|---|---|---|
| CN | 107208229 A | 9/2017 |
| EP | 2843062 A1 | 3/2015 |

(Continued)

OTHER PUBLICATIONS

Extended European Search Report for European Application No. 20 846 995.7, dated Aug. 12, 2022, 9 pages.

(Continued)

*Primary Examiner* — Binh X Tran
(74) *Attorney, Agent, or Firm* — Buchanan Ingersoll & Rooney PC

(57) ABSTRACT

The linear groove formation method includes a resist forming process of forming a coated resist on a surface of a steel sheet, a laser irradiating process of irradiating laser beams onto the steel sheet while repeating a laser scanning in a direction intersecting a rolling direction of the steel sheet cyclically in the rolling direction of the steel sheet to remove the coated resist in portions irradiated with the laser beams, and an etching process of forming linear grooves by etching portions of the steel sheet from which the coated resist is removed. In the laser irradiating process, the coated resist is removed by using two or more laser irradiating devices, with a certain irradiation energy, a certain beam diameter in a direction perpendicular to a laser scanning direction, and a (Continued)

certain incidence angle with respect to the surface of the steel sheet.

20 Claims, 5 Drawing Sheets

(51) Int. Cl.
    *B23K 26/073*     (2006.01)
    *B23K 26/08*     (2014.01)
    *B23K 26/364*     (2014.01)
    *B23K 26/40*     (2014.01)
    *B23K 101/16*     (2006.01)
    *B23K 101/34*     (2006.01)
    *B23K 101/36*     (2006.01)
    *B23K 103/04*     (2006.01)

(52) U.S. Cl.
    CPC ...... *B23K 26/0738* (2013.01); *B23K 26/0869* (2013.01); *B23K 26/364* (2015.10); *B23K 26/40* (2013.01); *B23K 2101/16* (2018.08); *B23K 2101/35* (2018.08); *B23K 2101/36* (2018.08); *B23K 2103/05* (2018.08); *C21D 2201/05* (2013.01); *C21D 2261/00* (2013.01)

(56) References Cited

U.S. PATENT DOCUMENTS

| | | | | |
|---|---|---|---|---|
| 2013/0139932 | A1* | 6/2013 | Sakai | .................. H01F 41/0206 148/307 |
| 2016/0333435 | A1 | 11/2016 | Inoue et al. | |
| 2018/0017868 | A1 | 1/2018 | Suehiro et al. | |
| 2018/0119242 | A1* | 5/2018 | Kobayashi | ........... B23K 26/082 |
| 2018/0147663 | A1* | 5/2018 | Takajo | ..................... C23F 1/28 |

FOREIGN PATENT DOCUMENTS

| | | | |
|---|---|---|---|
| EP | 3098328 | A1 | 11/2016 |
| EP | 3257960 | A1 | 12/2017 |
| EP | 3330388 | A1 | 6/2018 |
| JP | 0732575 | A | 2/1995 |
| JP | 11199936 | A | 7/1999 |
| JP | 11279646 | A | 10/1999 |
| JP | 2013072116 | A | 4/2013 |
| JP | 2016113643 | A | 6/2016 |
| JP | 2017025377 | A | 2/2017 |
| JP | 2020090709 | A | 6/2020 |
| KR | 20140133599 | A | 11/2014 |
| WO | 2015111434 | A1 | 7/2015 |
| WO | 2016129235 | A1 | 8/2016 |
| WO | 2017017908 | A1 | 2/2017 |
| WO | 2018117672 | A1 | 6/2018 |

OTHER PUBLICATIONS

Korean Office Action for Application No. 10-2022-7002815, dated Oct. 24, 2023 with Concise Statement of Relevance of Office Action, 6 pages.
International Search Report and Written Opinion for International Application No. PCT/JP2020/026183, dated Sep. 24, 2020, 8 pages.
Canadian Examination Report for Canadian Application No. 3,145,208, dated Nov. 21, 2022, 5 pages.
Chinese Office Action with English language translation of the Search Report for Chinese Application No. 202080054044.6, dated Apr. 28, 2023, 10 pages.

* cited by examiner (a)

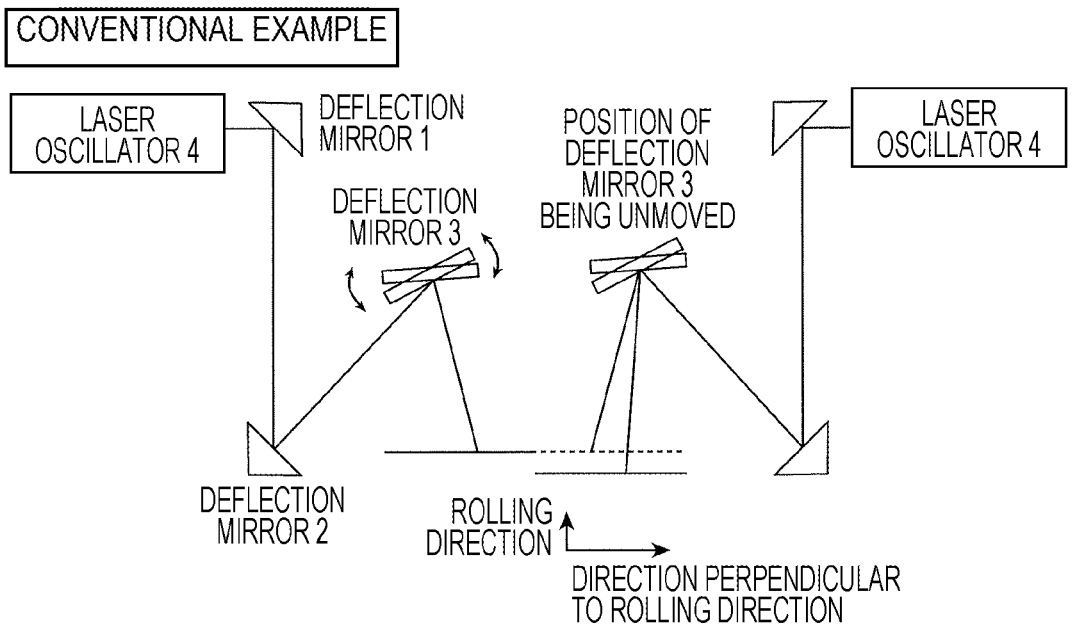

NOT ONLY A DEFLECTION DIRECTION WITH RESPECT TO A DIRECTION PERPENDICULAR TO THE ROLLING DIRECTION BUT ALSO A POSITION IN THE ROLLING DIRECTION IS ADJUSTED BY CONTROLLING THE ANGLE OF DEFLECTION MIRROR 3.

(b)

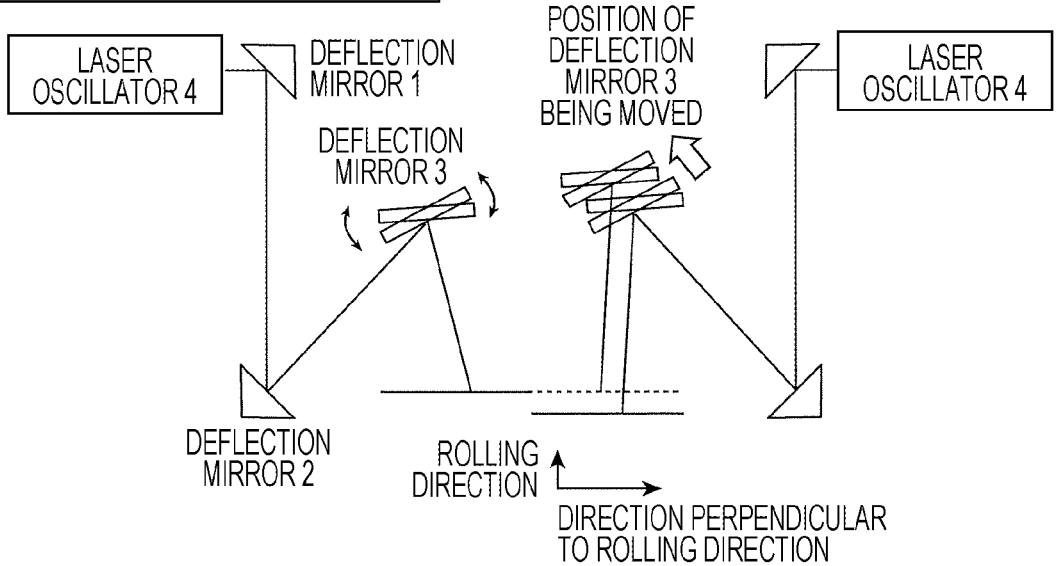

A LASER DEFLECTION DIRECTION WITH RESPECT TO A DIRECTION PERPENDICULAR TO THE ROLLING DIRECTION IS ADJUSTED BY CONTROLLING THE ANGLE OF THE DEFLECTION MIRROR 3. A POSITION IN THE ROLLING DIRECTION IS ADJUSTED BY CONTROLLING THE POSITION OF THE DEFLECTION MIRROR 3.

LINEAR GROOVE FORMATION METHOD AND LINEAR GROOVE FORMING APPARATUS, AND METHOD FOR MANUFACTURING GRAIN-ORIENTED ELECTRICAL STEEL SHEET

CROSS REFERENCE TO RELATED APPLICATIONS

This is the U.S. National Phase application of PCT/JP2020/026183, filed Jul. 3, 2020, which claims priority to Japanese Patent Application No. 2019-140967, filed Jul. 31, 2019 the disclosures of these applications being incorporated herein by reference in their entireties for all purposes.

FIELD OF THE INVENTION

The present invention relates to a linear groove formation method in which linear grooves are formed on a steel sheet surface by performing etching. The present invention particularly relates to a linear groove formation method that is capable to form linear grooves having a uniform shape and to inhibit a deterioration in the magnetic properties of a grain-oriented electrical steel sheet due to laser irradiation for removing a resist. In addition, the present invention relates to a linear groove forming apparatus suitable for implementing the above-mentioned method and to a method for manufacturing a grain-oriented electrical steel sheet by using the above-mentioned method.

BACKGROUND OF THE INVENTION

A grain-oriented electrical steel sheet, which is excellent in terms of magnetic properties, is used mainly as an iron core material for a transformer, and there is a demand for decreasing the iron loss of the steel sheet to increase the energy use efficiency of the transformer. Examples of known methods for decreasing the iron loss of a grain-oriented electrical steel sheet include not only a method for highly orienting secondary recrystallized grains in the steel sheet in the Goss orientation (sharpening), a method for increasing the film tension of an insulation coating film formed on the steel sheet surface, and a method for decreasing the thickness of the steel sheet but also a method for surface processing of the steel sheet.

A technique for decreasing iron loss by performing surface processing of a steel sheet is a technique in which non-uniform strain is applied by using a physical method to the surface of the steel sheet to refine the width of magnetic domains, thereby decreasing iron loss. Examples of such a technique for decreasing iron loss include a method in which grooves are formed by using a toothed roll on the surface of a steel sheet which is subjected to finish annealing. With this method, it is possible to decrease the iron loss of a steel sheet by forming grooves to refine magnetic domains on the surface of the steel sheet. In addition, it is known that, even in the case that a heat treatment such as stress-relief annealing is performed after the grooves are formed, since the formed grooves are not eliminated, the effect of decreasing iron loss is maintained. However, in the case of this method, there is a problem in that non-uniform grooves tend to be formed due to significant abrasion occurring in the toothed roll and in that there is an increase in manufacturing costs when the roll is heated or a lubricant is applied to the roll to inhibit the abrasion of the toothed roll.

Therefore, a method has been developed for forming linear grooves on the surface of a steel sheet by performing etching without using a mechanical means such as a toothed roll. Specifically, in the aforementioned method, after having formed a resist pattern on the steel sheet surface by coating a resist ink to the surface of a steel sheet on which a forsterite coating film is not yet formed. Then, grooves are formed on the steel sheet surface by selectively etching portions on which the resist ink is not coated by using an etching method such as an electroetching method. In the case of this method, since almost no mechanical abrasion occurs in the equipment, there is a decreased difficulty in maintaining the equipment compared with the case of the method in which a toothed roll is used.

Incidentally, it is known that the magnetic properties of a steel sheet on which such linear grooves are formed are strongly affected by the shape of the linear grooves. Moreover, it is known that iron loss is affected not only by the depth and width of the grooves but also by detailed factors such as curvature at the boundary of the side wall and bottom in the groove section. Therefore, when linear grooves are formed by using an etching method as described above, in the case that there is a variation in the shape of the resist pattern, which functions of an etching mask, there is a variation in the shape of the grooves, which results in a variation in the magnetic properties of a steel sheet. Therefore, techniques in which, in a method for forming linear grooves by performing etching, a variation in the magnetic properties of a steel sheet is inhibited by improving the application accuracy of a resist ink are proposed.

For example, Patent Literature 1 proposes a technique in which linear grooves having a uniform shape are formed by controlling the temperature of a resist ink and a steel sheet to be constant when the resist ink is applied. By controlling the temperature to be constant, there is a decreased variation in the viscosity of the resist ink, which results in a decreased variation in the shape of the grooves.

Patent Literature 2 proposes a technique in which, in the case that a resist ink is applied by using a gravure offset printing method, conditions such as the viscosity of the used resist ink and the mesh pattern of a gravure roll are controlled to be within specified ranges. With this, it is possible to inhibit halftone dots from occurring due to gravure cells formed on the surface of the gravure roll, which results in an improvement in the accuracy of a resist pattern.

In accordance with the methods proposed in Patent Literature 1 and Patent Literature 2 as described above, there is an improvement in the shape accuracy of a resist to some extent. However, it is still not possible to completely solve the problem of a variation in the shape of the grooves even in the case that the linear grooves are formed by using such methods.

Instead of using these methods for improving the shape accuracy of a resist pattern, Patent Literature 3 proposes a method in which a resist pattern is formed by using a laser. That is, after a uniform coated resist is formed across the whole surface of a steel sheet, by irradiating portions in which a resist is not necessary with a laser beam to evaporate or sublime the resist instantaneously, the resist in the portions irradiated is selectively removed. By using such a method, since there is no effect of, for example, a variation in the shapes of gravure cells on the shapes of the portions in which a resist is removed, it is expected that it is possible to form linear grooves having a uniform shape. In Patent Literature 3, from the results of additional investigations regarding the effect of the removal of a resist by performing laser irradiation on a grain-oriented electrical steel sheet (base steel sheet), it was clarified that it is important to control laser power, beam diameter, coated resist thickness, and the like. However, even in the case that such parameters are controlled, there is a case that it is not possible to completely solve the problem in which it is not possible to achieve a desired resist-removed portion width or in which there is an insufficient effect of decreasing a variation in the shapes of the grooves.

PATENT LITERATURE

PTL 1: Japanese Unexamined Patent Application Publication No. 11-279646
PTL 2: Japanese Unexamined Patent Application Publication No. 7-32575
PTL 3: International Publication No. WO2017/017908

SUMMARY OF THE INVENTION

Aspects of the present invention have been completed in view of the situation described above. An object according to aspects of the present invention is to provide a linear groove formation method in which linear grooves are formed on a steel sheet surface by performing etching that is capable for forming linear grooves having a uniform shape while preventing a deterioration in the magnetic properties of a grain-oriented electrical steel sheet due to laser irradiation for resist removal. An additional object according to aspects of the present invention is to provide a linear groove forming apparatus suitable for implementing the above-mentioned method and to provide a method for manufacturing a grain-oriented electrical steel sheet by using the above-mentioned method.

The present inventors conducted detailed investigations regarding the effect of the resist removal by performing laser irradiation on, in particular, a grain-oriented electrical steel sheet (steel substrate) and, as a result, obtained the following knowledge.

(1) In the case that a groove width is excessively small, since magnetic pole coupling occurs, there is a decrease in the effect of magnetic domain refining. In addition, in the case that the groove width is large, since there is an increase in the amount of a material electrolyzed in etching, there is an increase in the hysteresis loss of a product steel sheet. From both of these points of view, it is necessary that the groove width is 10 μm or more and 100 μm or less. The groove width is almost equal to a width of a resist-removed portion, from which the coated resist is removed by performing laser irradiation, (hereinafter, also referred to as "resist-removed portion width") in a direction perpendicular to the laser scanning direction. Furthermore, the resist-removed portion width is almost equal to a laser beam diameter. Accordingly, it is preferable that the laser beam diameter is 10 μm or more and 100 μm or less. Here, the term "beam diameter" denotes a beam diameter in a direction perpendicular to the laser scanning direction (hereinafter, also simply referred to as a "beam diameter"). In addition, in the case that there is an increase in the incidence angle of a laser beam with respect to a steel sheet surface, since there is an increase in the irradiation area of the laser beam, there is an increase in resist-removed portion width, and there is an increase in the groove width. To form grooves having a small width, it is necessary that the incidence angle of a laser beam with respect to a steel sheet surface is 20° or less. Here, the expression "incidence angle of a laser beam with respect to a steel sheet surface" denotes an angle formed by the normal to the steel sheet surface and a laser beam irradiated to the steel sheet surface. For example, in the case that a laser beam direction is perpendicular to the steel sheet surface, the incidence angle of the laser beam with respect to the steel sheet surface is 0°.

(2) In the case that the coated resist is not completely removed in a portion irradiated with a laser beam, since a groove shape defect occurs, there is a deterioration in iron loss. To completely remove the coated resist in a portion irradiated with a laser beam, increasing a laser irradiation energy is effective. However, in the case that the laser irradiation energy is increased more than necessary, a melted portion or an oxidized portion is formed in a steel sheet. It was clarified that the formation state of such a melted portion or an oxidized portion varies in accordance with, for example, a variation in the intensity distribution within a laser beam or in the coating thickness of a resist ink. Such a formation state has a negative effect on electrolytic behavior of a steel sheet and provides a negative effect on the formation of a uniform groove shape. To achieve a preferable groove width by minimizing such a negative effect, it is necessary that the laser irradiation energy is lower than 30 J/m. Here, the term "laser irradiation energy" denotes an energy of a scanned laser beam per meter of scanning length.

(3) In the case that a width of a steel sheet which is to be irradiated with a laser beam is large, there is a case that plural laser irradiating devices arranged in the sheet transverse direction share respective sections of the steel sheet divided in the sheet transverse direction to irradiate laser beams to remove the coated resist. In the case that there is a portion on the steel sheet surface in which laser beams irradiated from laser irradiating devices adjacent to each other in the sheet transverse direction overlap each other (hereinafter, also referred to as a "lap portion"), a melted portion or an oxidized portion may be formed in such a lap portion. Since such a melted portion or an oxidized portion has an influence on etching capability in a subsequent electroetching process, formation of uniform grooves is hindered. On the other hand, in the case that the laser beams are shifted with respect to each other in the rolling direction so that such a lap portion is not formed, an amount of resist-removed portions due to laser irradiation increases and the amount of a material electrolyzed is increases which results in a deterioration in magnetic properties. However, from the results of the investigations on the steel sheet samples in which electroetching properties are affected, it was clarified that a melted portion or an oxidized portion is formed only in the case that laser beam centers, at which an energy density peaks, overlap each other. Therefore, it was found that it is possible to prevent the formation of a melted portion and an oxidized portion by intentionally shifting centers of two laser beams irradiated from the two adjacent laser irradiating devices with a distance (5% to 95% of the beam diameter) in a direction perpendicular to the laser scanning direction.

(4) A melted portion or an oxidized portion is formed in the case that a shift amount between centers of the above-described two laser beams (a shift amount (a distance between laser beam centers) in a direction perpendicular to the laser scanning direction when two laser beams are shifted) is small. On the other hand, there is an increase in the amount of material electrolyzed in the case that the shift amount is large. Since the beam diameter is 100 μm or less, it is necessary that the shift amount be controlled in the order of micrometers, that is, high-accuracy control be performed. However, since positional fluctuation over time occurring in equipment due to a change in a surrounding environment (temperature, humidity, or the like) is inevitable, it is necessary that some adjustment function be introduced. Generally, a beam irradiation position is controlled by adjusting an angle of a laser deflection mirror in a laser irradiating device. However, in the case that there is an increase in the incidence angle of a laser beam with respect to a steel sheet surface, the irradiation area of the laser beam on the steel sheet surface increases and the groove width increases. Therefore, it is preferable that the incidence angle of a laser beam with respect to a steel sheet surface is as close to 0° (normal to the steel sheet surface) as possible. At least, it is necessary that the incidence angle is 20° or less. Therefore, a method in which the beam irradiation position (position of the center of laser beam) is adjusted by moving a laser deflection mirror back and forth in the laser beam incidence direction onto this mirror is more preferable, because this makes possible to control the beam irradiation position while preventing an increase in groove width.

On the basis of the knowledge described above, detailed investigations were conducted regarding the conditions applied for removing a resist by performing laser irradiation, which has led to the completion of aspects of the present invention.

That is, the subject matter of aspects of the present invention is as follows.

[1] A linear groove formation method which includes:
   a resist forming process of forming a coated resist on a surface of a steel sheet,
   a laser irradiating process of irradiating laser beams onto the steel sheet surface while repeating a laser scanning in a direction intersecting a rolling direction of the steel sheet cyclically in the rolling direction of the steel sheet to remove the coated resist in portions irradiated with the laser beams, and
   an etching process of forming linear grooves by etching portions of the steel sheet from which the coated resist is removed,
   in which, in the laser irradiating process:
   the coated resist is removed by using two or more laser irradiating devices; and
   an irradiation energy, a beam diameter in a direction perpendicular to a laser scanning direction, and an incidence angle with respect to the surface of the steel sheet of the laser beams irradiated from respective ones of the laser beam irradiating devices is lower than 30 J/m, 10 µm or more and 100 µm or less, and 20° or less, respectively.

[2] The linear groove formation method according to item [1], which further includes:
   shifting centers of two of the laser beams irradiated onto the surface of the steel sheet from respective ones of the laser irradiating devices arranged adjacent to each other in a sheet transverse direction of the steel sheet by 5% to 95% of the beam diameter in a direction perpendicular to the laser scanning direction.

[3] The linear groove formation method according to item [2], in which:
   each of the laser irradiating devices has at least one laser deflection mirror for directing a corresponding one of the laser beams emitted from a laser oscillator to the surface of the steel sheet; and
   a position of the center of the corresponding one of the laser beams is controlled by moving a position of the laser deflection mirror back and forth in a laser beam incidence direction onto the laser deflection mirror.

[4] The linear groove formation method according to any one of items [1] to [3], which further includes:
   an image taking process of taking an image of resist-removed portions from which the coated resist is removed by irradiating the surface of the steel sheet with the laser beams, between the laser irradiating process and the etching process,
   in which, in the image taking process, the image is taken at ends in the laser scanning direction of the resist-removed portions irradiated with the laser beams from respective ones of the laser irradiating devices arranged adjacent to each other in a sheet transverse direction of the steel sheet to remove the coated resist.

[5] The linear groove formation method according to item [4] which further includes:
   monitoring, on a basis of the taken image, to verify that the ends in the laser scanning direction of the resist-removed portions are not spaced from each other and the resist-removed portions are not discontinuous or that an overlapped portion of the resist-removed portions where the ends overlap each other has a desired shape.

[6] The linear groove formation method according to item [4] or [5], which further includes:
   measuring, on a basis of the taken image, a shift amount in an overlapped portion of the resist-removed portions where the ends overlap each other; and
   feeding back the shift amount to an adjusting unit for automatically controlling the position of the laser deflection mirror to adjust the position of the laser deflection mirror of the laser irradiating device so that the shift amount is within a predetermined range.

[7] A linear groove forming apparatus used for the linear groove formation method according to any one of items [1] to [6], which includes:
   a deliverer for delivering a steel sheet wound in a coil,
   a welder for joining the steel sheet delivered from the coil with each other,
   a resist coater for coating a resist on a surface of the steel sheet,
   a dryer for drying the resist coated on the surface of the steel sheet to form a coated resist,
   a steel sheet-surface laser irradiator for irradiating laser beams onto the surface of the steel sheet from respective ones of two or more laser irradiating devices while scanning the laser beams in a direction intersecting a rolling direction of the steel sheet, on which the coated resist is formed, to remove the coated resist from portions irradiated with the laser beams,
   an etcher for etching the steel sheet in portions from which the coated resist is removed,
   a steel sheet-surface resist stripper for stripping the coated resist from the surface of the steel sheet,
   a cutter for cutting the steel sheet, and
   a coiler for coiling the steel sheet,
   arranged in the stated order.

[8] The linear groove forming apparatus according to item [7], which further includes:
   a looper for controlling a sheet passing speed in the steel sheet-surface laser irradiator to be constant, and
   a dust collector and/or an exhaust gas cleaner for collecting the coated resist which is made into dust particle or gasified due to irradiation with the laser beams.

[9] The linear groove forming apparatus according to item [7] or [8], in which:
   each of the laser irradiating devices has at least one laser deflection mirror for directing a corresponding one of the laser beams emitted from a laser oscillator to the surface of the steel sheet capable to control a position of a center of corresponding one of the laser beams by moving a position of the laser deflection mirror back and forth in a laser beam incidence direction onto the laser deflection mirror.

[10] The linear groove forming apparatus according to any one of items [7] to [9], which further includes:

an image taking unit for taking an image of resist-removed portions from which the coated resist is removed by irradiating the laser beams, in which the image taking unit takes an image of ends in the laser scanning direction of the resist-removed portions irradiated with the laser beams from respective ones of the laser irradiating devices arranged adjacent to each other in a sheet transverse direction of the steel sheet to remove the coated resist.

[11] The linear groove forming apparatus according to item [10], in which:

the image taking unit has a monitoring unit for monitoring, on the basis of the taken image, to verify that ends in the laser scanning direction of the resist-removed portions are not spaced from each other and the resist-removed portions are not discontinuous or that an overlapped portion of the resist-removed portions where the ends overlap each other, has a desired shape.

[12] The linear groove forming apparatus according to item [10] or [11], which further includes:

a controlling unit for determining, on the basis of the taken image, a shift amount in an overlapped portion of the resist-removed portions where the ends overlap each other, feeding back the shift amount to an adjusting unit that adjusts a position of a laser deflection mirror of a laser irradiating device, and automatically controlling the position of the laser deflection mirror so that the shift amount is within a predetermined range.

[13] A method for manufacturing a grain-oriented electrical steel sheet, the method including forming linear grooves on a surface of a grain-oriented electrical steel sheet by using the linear groove formation method according to any one of items [1] to [6].

According to aspects of the present invention, it is possible to form uniform linear grooves when the linear grooves are formed on the surface of a steel sheet by performing etching. According to aspects of the present invention, since it is possible to prevent the formation of a melted portion and an oxidized portion, which are formed on a steel sheet due to laser irradiation, it is possible to form narrow, deep linear grooves having a uniform shape. Therefore, in particular, in the case of a grain-oriented electrical steel sheet, since it is possible to maximally realize the effect of magnetic domain refining due to the formation of grooves, it is possible to obtain a grain-oriented electrical steel sheet excellent very much in terms of iron loss characteristics. In particular, in the case that a high-power single-mode fiber laser is used as a laser irradiating device, since it is possible to remove a resist at a high rate, it is possible to achieve both high productivity and low iron loss.

BRIEF DESCRIPTION OF THE DRAWINGS

FIG. 7 is a diagram illustrating a method for controlling the central position of a laser beam, FIG. 7(a) is a diagram illustrating one example of a conventional controlling method, and FIG. 7(b) is a diagram illustrating one example of the controlling method according to aspects of the present invention.

DETAILED DESCRIPTION OF EMBODIMENTS OF THE INVENTION

First, experimental results that clarified the relationship between groove width and iron loss will be described.

Figure 1:
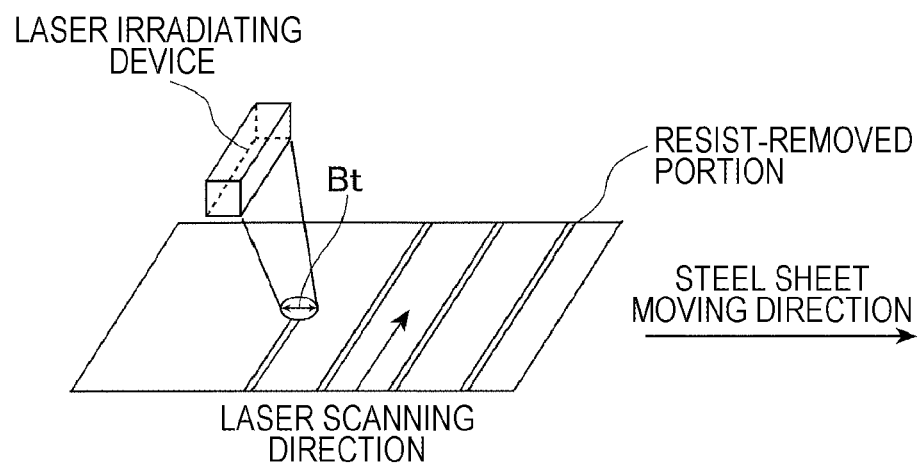
FIG. 1 is a diagram of the main features of laser irradiation.

As illustrated in FIG. 1, while a steel sheet (a cold rolled steel sheet for a grain-oriented electrical steel sheet in this experiment) having a coated resist formed on the surface thereof and a thickness of 0.23 mm passed in the direction of the arrow. And laser irradiation was repeated at intervals of 5 mm in the rolling direction by scanning a laser irradiating device in a direction perpendicular to the rolling direction (steel sheet moving direction in the figure). Here, as a laser irradiating device, a fiber laser-type device was used, and a beam diameter (Bt in the figure) was controlled to be 5 μm to 300 μm by changing the fiber. Here, by obtaining the intensity profile of the beam by using a commercially available CCD camera-type stationary beam profiler, the beam diameter was defined as the profile width at the position at which the intensity was equal to the maximum intensity multiplied by 0.135. Laser irradiation was performed such that a single-mode fiber laser was irradiated by using a galvanometer scanner method under the conditions of a laser irradiation energy of 25 J/m, a scan width of 200 mm, and a scan interval in the rolling direction of 5 mm. Under all of the conditions, the coated resist was completely removed from the portions irradiated with the laser beam.

Subsequently, grain-oriented electrical steel sheets (product steel sheets) were manufactured by performing electroetching on the samples from which the coated resist is removed and by using a known method. As one example, a method in which, after performing electroetching as described above, decarburization annealing, coating an annealing separator, final annealing for the purpose of secondary recrystallization and the formation of a forsterite coating film, flattening annealing, and the formation of a tension coating are performed. Thereafter, the relationship between groove width and iron loss was investigated. Here, iron loss $W_{17/50}$ was evaluated by using a single sheet tester in accordance with JIS C 2556 under the conditions of a magnetic flux density of 1.7 T and an excitation frequency of 50 Hz. The sample used here had a $B_8$ of 1.90 T when the sample was made into a grain-oriented electrical steel sheet (product steel sheet) by using the same method as described above without the groove formation (electroetching treatment). Moreover, the depth of the groove (groove depth), which was formed by performing an electroetching treatment on the sample, was controlled to have a constant value by adjusting the treatment time of electroetching.

Figure 2:
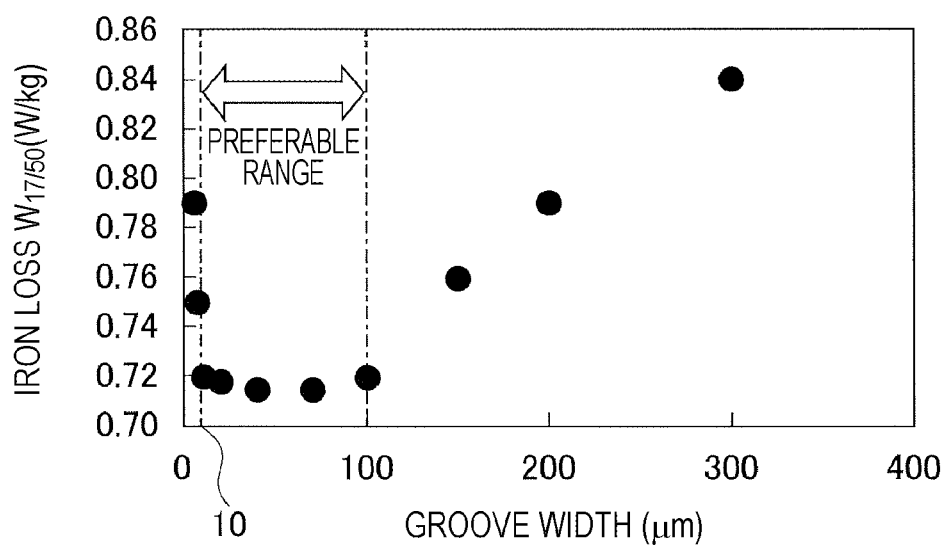
FIG. 2 is a graph illustrating the relationship between groove width and iron loss.

From the results given in FIG. 2, it was clarified that iron loss was satisfactory when the groove width was 10 μm to 100 μm. The reason why iron loss increases with an increase in groove width is because the hysteresis loss of the product increases with an increase in the amount of a material electrolyzed in etching. On the other hand, the reason why there was a deterioration in iron loss in the case that the groove width was excessively small, is considered to be because there was a decrease in the effect of magnetic domain refining due to the occurrence of magnetic pole coupling. Since the groove width is almost equal to the laser beam diameter (Bt in FIG. 1), it is clarified that controlling a laser beam diameter to be 10 μm to 100 μm is important for decreasing iron loss.

Figure 3:
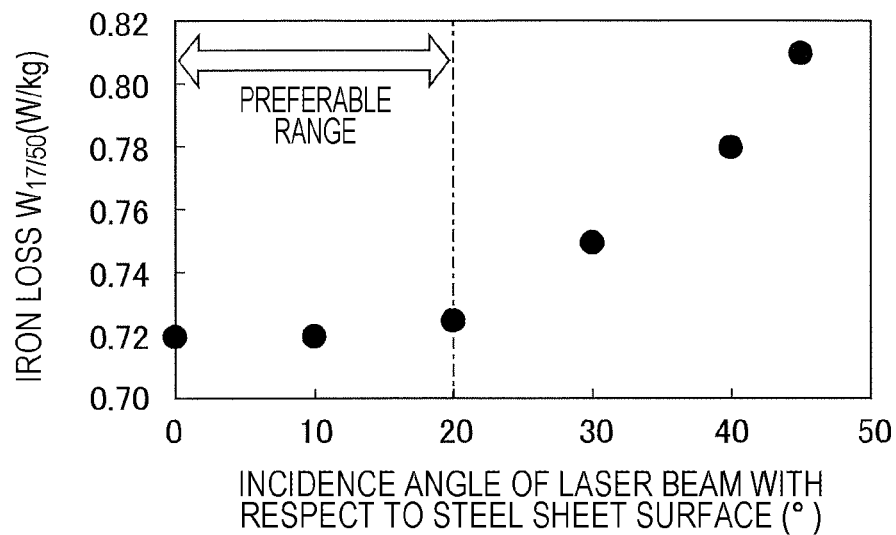
FIG. 3 is a graph illustrating the relationship between incidence angle of a laser beam with respect to a steel sheet surface and iron loss.

Secondly, the relationship between laser beam incidence direction and iron loss was investigated. Here, an oscillator having a laser beam diameter of 100 μm was used, and the incidence angle of a laser beam with respect to the steel sheet surface was controlled to be 0° to 45°. Here, the incidence angle when a laser beam is irradiated from right above to a steel sheet surface is defined as 0°. Here, the reason why the effect of the incidence angle of the laser beam was investigated was because it was considered that an irradiation area of a laser beam varies in accordance with the incidence angle, which has an effect on the groove width. From the results given in FIG. 3, there was a tendency for iron loss to be significantly deteriorated in the case that the incidence angle was more than 20°. This is because there was an increase in groove width due to an increase in the irradiation area of a laser beam. Here, in this experiment, since the laser beam diameter was 100 μm, which is the upper limit of the beam diameter in accordance with aspects of the present invention, that is, with which the irradiation area of a laser beam peaks. Accordingly, an incidence angle of a laser beam of 20° or less is applicable to the whole range of the beam diameter according to aspects of the present invention, that is, a beam diameter of 10 μm to 100 μm.

Hereafter, the results of experiments conducted for further investigating the effect of removal of coated resist by performing laser irradiation on a grain-oriented electrical steel sheet (base steel sheet) will be described.

Figure 4:
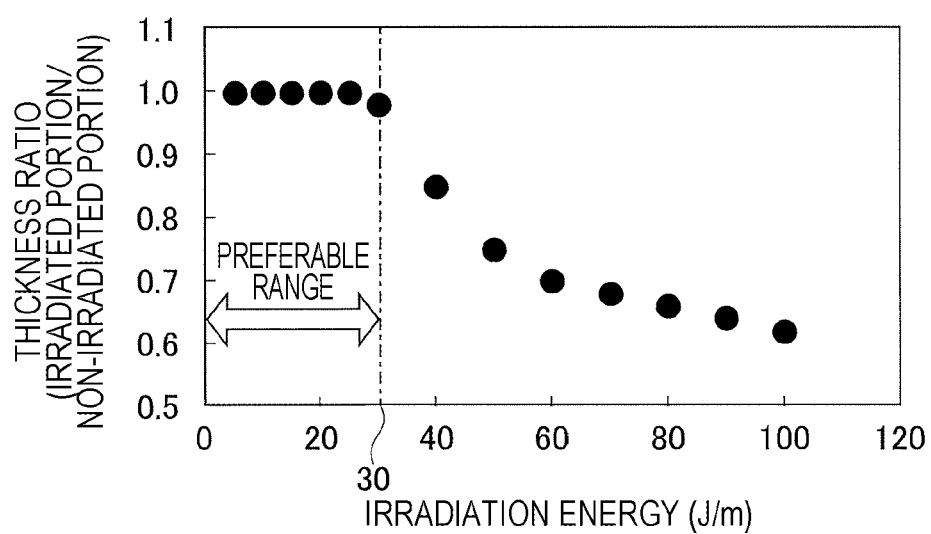
FIG. 4 is a graph illustrating the relationship between laser irradiation energy and sheet thickness ratio (irradiated portion/non-irradiated portion).

Same as in the case of FIG. 1 (note that, however, the target of laser irradiation was a cold rolled steel sheet for a grain-oriented electrical steel sheet which had no coated resist formed on the surface thereof), while a cold rolled steel sheet having no coated resist formed on the surface thereof passed in the direction of the arrow. And laser irradiation was repeated at intervals of 5 mm in the rolling direction by scanning a laser irradiating device in a direction perpendicular to the rolling direction (steel sheet moving direction). Here, laser irradiation was performed such that a single-mode fiber laser was irradiated by using a galvanometer scanner method under the conditions of a laser irradiation energy of 5 J/m to 100 J/m, a scan width of 200 mm, and a scan interval in the rolling direction of 5 mm. Subsequently, after having performed an electroetching treatment on the samples obtained as described above, the electrolytic states of the portions irradiated with a laser beam and the portions not irradiated with a laser beam were compared. From the results given in FIG. 4, an electroetching rate was less in the portions not irradiated with a laser beam than in the portions irradiated with a laser beam, and such a difference became marked in the case that there was an increase in the laser irradiation energy. That is, the ratio of the thickness of the portions irradiated with a laser beam to the thickness of the portions not irradiated with a laser beam (irradiated portion/non-irradiated portion) after having performed the electroetching treatment decreased with an increase in the laser irradiation energy. This is presumed to be because of the formation of a heat-affected portion (melted portion) and an oxidized portion due to laser irradiation. It was clarified that such an influence was small in the case that the laser irradiation energy was 30 J/m or lower and that, to form uniform grooves, it is important that the laser irradiation energy is within such a range. In the case that a coated resist exists on a steel sheet surface, there is a decrease in the amount of the laser energy which reaches the steel sheet due to the effect of the resist compared with the case that no coated resist is formed on a steel sheet surface. Therefore, it was clarified that, under the assumption that a coated resist is formed on a surface, it is possible to avoid the effect due to the formation of a melted portion or an oxidized portion in the case that a condition of a laser irradiation energy of lower than 30 J/m is applied. It is preferable that the laser irradiation energy is 10 J/m or lower.

Figure 5:
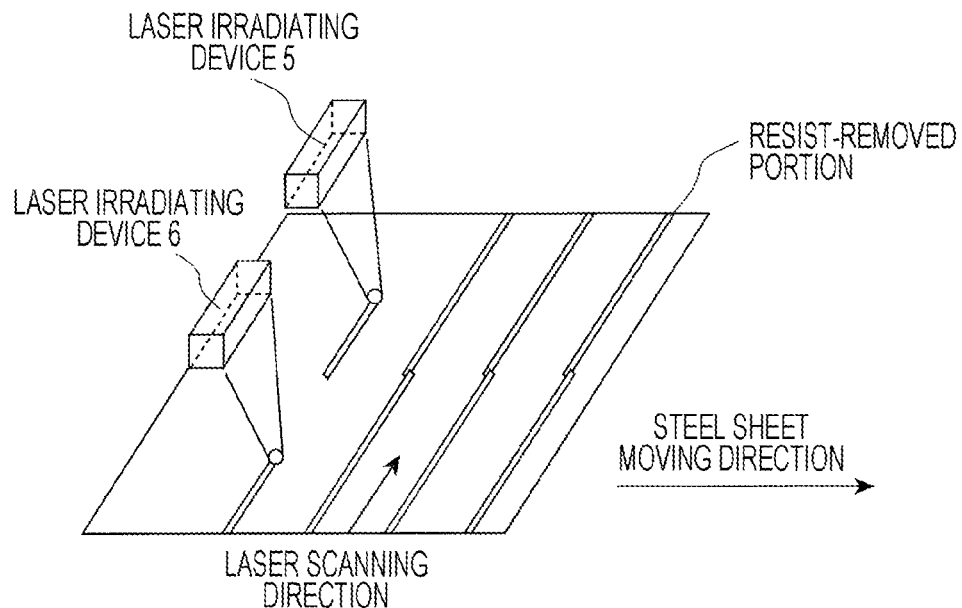
FIG. 5(a) is a diagram of the main features of laser irradiation by using two laser irradiating devices.
FIG. 5(b) is a diagram illustrating the overlapped portion of resist-removed portions formed by the laser irradiation.
Figure 5:
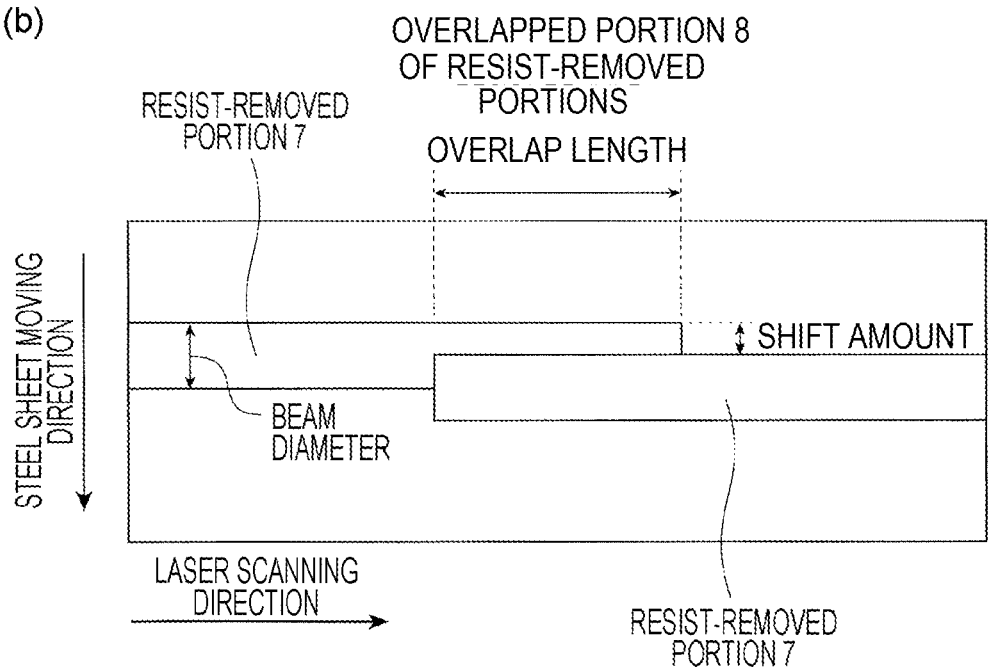

On the basis of the knowledge described above, as illustrated in FIG. 5(a), while a cold rolled steel sheet having a coated resist formed on the surface thereof passed in the rolling direction (steel sheet moving direction in the figure). And laser irradiation was repeated at intervals of 3 mm in the rolling direction by arranging two laser irradiating devices (laser irradiating device 5 and laser irradiating device 6) in the sheet transverse direction of the steel sheet and by scanning the laser irradiating devices in a direction perpendicular to the rolling direction. That is, in this experiment, laser irradiation in the sheet transverse direction of a steel sheet is performed such that each of the two laser irradiating devices covers a corresponding one of the divisions. Here, laser irradiation by using each of the two laser irradiating devices was performed such that a single-mode fiber laser was irradiated by using a polygon mirror method under the conditions of a laser power of 1.5 kW, a scanning speed of 150 m/s, a scan interval in the rolling direction of 3 mm, a beam diameter of 50 μm, and a scan width per device of 600 mm.

Subsequently, when observation was performed on the resist-removed portions by using a microscope, only one melted portion was recognized. The position at which the melted portion was recognized was a position at which the centers of the two laser beams, each of which was irradiated from a corresponding one of the two laser irradiating devices, overlap each other.

Therefore, to avoid the formation of a melted portion, samples were prepared by removing a coated resist with laser irradiation by shifting the centers of the two laser beams in the steel sheet moving direction (rolling direction). At this time, as illustrated in FIG. 5(b), a shift amount in the steel sheet moving direction between resist-removed portions in a portion (overlapped portion 8 of the resist-removed portions) where the ends in the laser scanning direction of the resist-removed portions 7 overlap each other was varied. Each of the resist-removed portions 7 is formed by the irradiation with a laser beam irradiated from a corresponding one of the laser irradiating devices adjacent to each other in the sheet transverse direction of the steel sheet to remove a resist.

Subsequently, after performing an electroetching treatment on the samples from which the coated resist is removed, grain-oriented electrical steel sheet (product steel sheet) was manufactured by using a known method. And samples each having a width of 100 mm in which the above-described overlapped portion of the resist-removed portions subjected to etching were contained in the central portion thereof were taken from the product steel sheet, and magnetic properties were evaluated in accordance with JIS C 2556.

Figure 6:
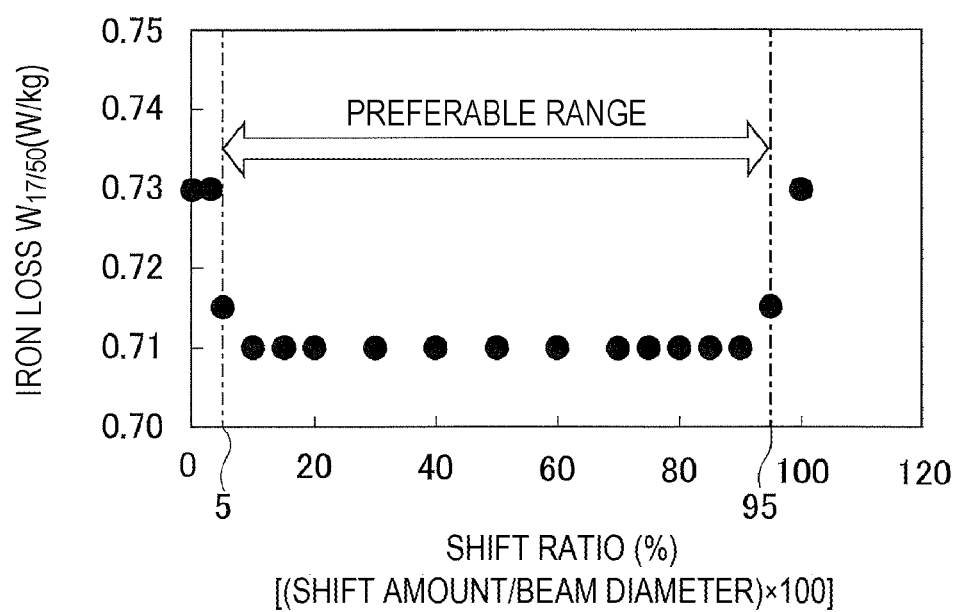
FIG. 6 is a graph illustrating the relationship between the shift ratio in an overlapped portion of resist-removed portions and iron loss.

The relationship between the ratio of the shift amount to a beam diameter (shift ratio:(shift amount/beam diameter)× 100) and the measured iron loss is illustrated in FIG. 6. Here, the shift amount described above is equal to a shifting width between the centers of the two laser beams, each of which was irradiated form a corresponding one of the laser irradiating devices adjacent to each other. In addition, the overlap length (refer to FIG. 5(*b*)) in the laser scanning direction of the overlapped portion of resist-removed portions was 3 mm. As illustrated in FIG. 6, in the case that the shift ratio was 5% to 95%, iron loss was satisfactory, and, correspondingly, a melted portion or an oxidized portion was not recognized in the overlapped portion (lap portion) of the resist-removed portions. In the case of a shift ratio of 100%, it is considered that, although a melted portion or an oxidized portion was not recognized in the lap portion, there was a decrease in the effect of magnetic domain refining, because the resist-removed portions were separated (that is, the linear grooves were separated).

From the results described above, specific embodiments of the present invention will be described. Here, in the description below, one preferable embodiment of the present invention will be described, and the present invention is not limited by the description below at all.

In the method according to aspects of the present invention, the following processes (1) to (3) are performed in this order to a steel sheet and, in particular, a grain-oriented electrical steel sheet.

(1) Resist forming process
(2) Laser irradiating process
(3) Etching process

In addition, it is preferable that an image taking process of monitoring a resist removal state be performed between (2) the laser irradiating process described above and (3) the etching process described above. Since a groove shape varies mainly in accordance with the resist removal state, it is possible to monitor the resist removal state by monitoring the groove width. However, since the groove shape is affected by factors other than the resist removal state, it is more preferable that the resist removal state is directly monitored before grooves are formed.

[Steel Sheet]

In accordance with aspects of the present invention, when linear grooves are formed on the surfaces of various kinds of steel sheets by performing etching, it is possible to form narrow, deep linear grooves having a uniform shape. Therefore, although there is no particular limitation on the kind of a target steel sheet, it is preferable to use aspects of the present invention for a grain-oriented electrical steel sheet, because aspects of the present invention are effective particularly for decreasing the iron loss of a grain-oriented electrical steel sheet. When aspects of the present invention are used for a grain-oriented electrical steel sheet, a steel sheet which is subjected to cold rolled so as to have a final thickness and which is in an intermediate stage of a manufacturing process of a grain-oriented electrical steel sheet (as one example, stage before a decarburization annealing process) is used as a base material. There is no particular limitation on the kind of the above-described grain-oriented electrical steel sheet, and any kind of grain-oriented electrical steel sheet may be used. However, it is preferable to use a grain-oriented electrical steel sheet having a chemical composition containing Si in an amount of 2.0 mass % to 8.0 mass % from the viewpoint of low iron loss. It is more preferable to use a grain-oriented electrical steel sheet having a chemical composition containing Si in an amount of 2.5 mass % to 4.5 mass % from the viewpoint of sheet passage.

Here, preferable chemical compositions other than Si of a steel material (slab) for a grain-oriented electrical steel sheet are as follows. It is needless to say that the chemical compositions are not limited to the following ones and that any kind of electrical steel sheet certainly has less iron loss after aspects of the present invention are applied than a steel sheet before aspects of the present invention are applied.

C: 0.01 mass % to 0.08 mass %

C is an element which is necessary for improving a texture at the time of primary recrystallization, and it is preferable that the C content is 0.01 mass % or more to realize such an effect. On the other hand, in the case that the C content is more than 0.08 mass %, it is difficult to decrease the C content to 0.0050 mass % or less, with which magnetic aging does not occur, in a decarburization annealing process. Therefore, it is preferable that the C content is 0.01 mass % to 0.08 mass %. It is more preferable that the C content is 0.03 mass % or more. In addition, it is more preferable that the C content is 0.07 mass % or less.

Mn: 0.005 mass % to 1.0 mass %

Although Mn is an element which is effective for improving hot workability, it is not possible to realize such an effect in the case that the Mn content is less than 0.005 mass %. On the other hand, in the case that the Mn content is more than 1.0 mass %, there is a decrease in magnetic flux density. Therefore, it is preferable that the Mn content is 0.005 mass % to 1.0 mass %. It is more preferable that the Mn content is 0.010 mass % or more. In addition, it is more preferable that the Mn content is 0.2 mass % or less.

In addition, the basic constituents other than those described above of the steel material used for manufacturing the grain-oriented electrical steel sheet according to aspects of the present invention vary between a case that an inhibitor is utilized for secondary recrystallization to occur and a case that an inhibitor is not utilized for secondary recrystallization to occur.

In the case that an inhibitor is utilized for secondary recrystallization to occur, and, for example, in the case that an AlN-based inhibitor is utilized, it is preferable that Al: 0.01 mass % to 0.065 mass % and N: 0.005 mass % to 0.012 mass % are added. In addition, in the case that a MnS·MnSe-based inhibitor is utilized, it is preferable that S: 0.005 mass % to 0.03 mass % and/or Se: 0.005 mass % to 0.03 mass % are added.

On the other hand, in the case that an inhibitor is not utilized for secondary recrystallization to occur, it is preferable that the content of each of Al, N, S, and Se, which are inhibitor forming constituents, is limited as follows.

Al: 0.0100 mass % or less
N: 0.0050 mass % or less
S: 0.0050 mass % or less
Se: 0.0050 mass % or less In addition, to improve magnetic properties, the steel material used for manufacturing the grain-oriented electrical steel sheet according to aspects of the present invention may further contain one, two, or more selected from Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.03 mass % to 0.50 mass %, Mo: 0.005 mass % to 0.10 mass %, and Cr: 0.03 mass % to 1.50 mass % in addition to the basic constituents described above.

Ni is an element which is effective for improving magnetic properties by improving the microstructure of a hot rolled steel sheet. However, in the case that the Ni content is less than 0.03 mass %, it is not possible to sufficiently realize the effect described above. On the other hand, in the case that the Ni content is more than 1.50 mass %, since there is a decrease in the stability of secondary recrystallization, there is a deterioration in magnetic properties. In addition, although Sn, Sb, Cu, P, Mo, and Cr are elements which are effective for improving magnetic properties, it is not possible to sufficiently realize the effect of improving magnetic properties in the case that the content of each of such elements is less than the corresponding lower limit described above. On the other hand, in the case that the content of each of such elements is more than the corresponding upper limit described above, grain growth in secondary recrystallization is hindered. Therefore, it is preferable that the content of each of such elements is within the corresponding range described above.

The remainder that is different from the above-described constituents of the steel material used for manufacturing the grain-oriented electrical steel sheet according to aspects of the present invention is Fe and incidental impurities. Here, since there is a decrease in the C content due to primary recrystallization annealing, and since there is a decrease in the contents of Al, N, S, and Se due to purification in finish annealing, the contents of such constituents in a steel sheet after finish annealing is performed are decreased to a level of incidental impurities.

When etching is performed in the etching process, in the case that a coating film is formed on the surface of the grain-oriented electrical steel sheet described above, etching may be hindered. Therefore, it is necessary that a resist described below be coated directly to the surface of a steel sheet without a coating film such as a forsterite coating film or a tension coating including an insulation coating film, which is insoluble or hardly soluble in an etching solution (electrolytic solution).

[Resist Forming Process]

Before laser irradiation is performed, a coated resist is formed on the steel sheet surface. The coated resist functions as an etching resist, which is used for preventing the steel sheet from being etched in the etching process described below. As the etching resist, any kind of material may be used as long as it is possible to prevent the steel sheet from being etched. It is preferable to use, as the resist, a resist containing mainly a thermosetting resin. As the thermosetting resin, for example, at least one selected from the group consisting of an alkyd-based resin, an epoxy-based resin, and a melamine-based resin may be used. UV curability or electron curability, which is utilized in a semiconductor industrial field, is not necessary required. In addition, from the viewpoint of preventing a resist ink from drooping, it is preferable that the viscosity of the resin is as high as possible. To keep the viscosity of the resist ink at a high level, it is preferable that the temperature of the resist ink is 40° C. or lower when coating. On the other hand, although there is no particular limitation on the lower limit of the temperature of the resist ink when coating, it is preferable that the lower limit is 20° C. or higher. In addition, an insulation coating film, which is usually formed on the surface of an electrical steel sheet, may be used as a resist, although there is an equipment problem in that there is an increase in equipment size. In this case, a treatment solution for forming an insulation coating film may be applied by using a technique in the related art. Drying after the application may also be performed by using a technique in the related art.

There is no particular limitation on the method used for coating a resist ink to a steel sheet surface, and any kind of method may be used. It is preferable that the resist ink is coated by using a roll coating method. In particular, it is preferable to use a gravure printing method utilizing a gravure roll, and it is more preferable to use a gravure offset printing method utilizing an offset roll. Here, in the present description, the meaning of the expression "gravure printing method" includes printing methods utilizing a gravure roll in general and a gravure offset printing method. In addition, in the case that a gravure printing method is used, to control a coating thickness to be constant, it is preferable a doctor blade is disposed above a gravure roll to control the amount of ink on the gravure roll to be uniform.

There is no particular limitation on the resist forming pattern in accordance with aspects of the present invention, and any kind of pattern may be used as long as desired linear grooves are formed finally. In accordance with aspects of the present invention, since a coated resist is partially removed by performing laser irradiation, it is preferable that a resist is formed across the whole steel sheet surface.

It is preferable that the coating amount (amount of coating) of a resist is 1.0 g/m$^2$ to 10.0 g/m$^2$ in terms of total on both sides of a steel sheet. In the case that the coating amount is less than 1.0 g/m$^2$, since there is insufficient resist performance, insulation breakdown may occur when electroetching is performed. In addition, in the case that the coating amount is more than 10.0 g/m$^2$, there is an increased risk in that it is difficult to completely remove the coated resist with a laser irradiation energy of lower than 30 J/m. Here, the expression "coating amount of a resist" denotes the value before the laser irradiation and after drying the coated resist. The coating amount of a resist is derived from the difference in the weight of the sample (steel sheet) between before resist coating and after drying the coated resist and the resist-coated area.

After a resist ink is coated to a steel sheet surface, the resist ink is dried to form a coated resist on the steel sheet surface before a subsequent laser irradiating process. There is no particular limitation on the method used for drying a resist, and, for example, a hot-air drying method, a vacuum drying method, or the like may be used. In the case of a hot-air drying method, it is preferable that a drying temperature is 180° C. to 300° C. In the case of a vacuum drying method, it is preferable that a pressure is 10 Pa or lower and that a drying time is 5 seconds or more.

Here, in the case that laser irradiation energy is lowered, there may be a case that a coated resist is not completely removed. Further, there is a risk in that, when a thick portion exists in a coated resist film due to the low uniformity of the thickness of the coated resist film, the coated resist is not removed completely, even in the case that an average thickness of the coated resist film (coating amount) is small. Therefore, it is preferable that the thickness of a coated resist is uniform to achieve satisfactory removal performance of the coated resist. Examples of an effective method for increasing the uniformity of the thickness of a coated resist include a method that the viscosity of a resist ink is adjusted, a method that the constituents (resin or the like) of a resist ink are uniformly dispersed by sufficiently stirring the resist ink, and a method that a coated resist is formed in a short time by performing high-temperature drying.

[Laser Irradiating Process]

Subsequently, laser irradiation is performed such that a laser beam is scanned in a direction intersecting the rolling direction of a steel sheet on which a coated resist is formed. By performing laser irradiation in such a manner, a coated resist in a portion which is irradiated with a laser beam is locally heated so as to be vaporized and thereby removed. As a result, a resist-removed portion where the surface of the steel sheet is exposed is formed. The portion of the steel sheet exposed in such a resist-removed portion is selectively etched in the etching process described below to form a linear groove. Since the dimensions of the linear groove formed by performing etching have effects on the final magnetic properties of a grain-oriented electrical steel sheet, it is necessary that a groove width is 10 µm or more and 100 µm or less. Here, since the groove width is almost equal to a resist-removed portion width, the beam diameter of a laser beam is set to be 10 µm or more and 100 µm or less. In addition, in the case that the incidence angle of a laser beam with respect to a steel sheet surface increases, the irradiation area of a laser beam increases, resist-removed portion width increases, and the groove width increases. To form grooves having a small width, it is necessary that the incidence angle of a laser beam with respect to a steel sheet is 20° or less.

It is preferable that the laser scanning described above is performed in a straight line. In addition, it is appropriate that a laser scanning direction is a direction intersecting the rolling direction. However, from the viewpoint of increasing the effect of decreasing iron loss, it is preferable that angle formed by the sheet transverse direction of the steel sheet (direction perpendicular to the rolling direction) and the laser scanning direction is 40° or less. It is more preferable that the laser scanning direction is parallel to the sheet transverse direction of a steel sheet (angle formed by the sheet transverse direction of the steel sheet and the laser scanning direction is 0°). Laser scanning in the laser irradiating process is performed cyclically in the rolling direction of the steel sheet. That is, laser scanning is repeated so that resist-removed portions are formed at a regular interval in the rolling direction of the steel sheet. It is preferable that the interval in the rolling direction between the resist-removed portions (hereinafter, referred to as "resist-removed portion interval") is 2 mm or more and 10 mm or less. The interval in the rolling direction between the linear grooves formed by performing etching (hereinafter, referred to as "linear groove interval") is equal to the resist-removed portion interval. Accordingly, by setting the resist-removed portion interval to be within the range described above, it is possible to control the linear groove interval to be within a preferable range, which results in a further improvement in the magnetic properties of a grain-oriented electrical steel sheet.

Incidentally, the kind of a laser to be used is determined from the viewpoint of iron loss and productivity. From the viewpoint of iron loss, since a small groove width is advantageous, it is preferable that the resist-removed portion width is decreased by using a laser irradiating device having high light condensation capability. On the other hand, from the viewpoint of productivity, performing laser scanning at a high speed is required. In the case that laser scanning is performed at a high speed, it is preferable to use a laser-irradiating device having a higher power to achieve an energy density necessary to remove a coated resist. To realize both high beam condensation capability and satisfactory laser power, preferable kind of laser is a single-mode fiber laser. It is preferable that the laser scanning described above is performed through the rotational drive of a mirror such as a galvanometer mirror or a polygon mirror from the viewpoint of increasing a scanning speed.

Since the width of a generally used steel sheet is about 1 m, in the case that one laser-irradiating device is used, it is difficult to uniformly irradiate the whole steel sheet width with a laser beam. Accordingly, it is required that, for example, a beam diameter is increased to achieve uniform beam properties. Therefore, it is necessary that the number of laser irradiating devices is two or more. Even in the case that plural laser irradiating devices are used, it is indispensable that the groove is continuously formed from the viewpoint of magnetic properties. However, a region (lap portion) where laser beams irradiated from two laser irradiating devices arranged adjacent to each other in the sheet transverse direction overlap each other is formed. In the case that the central positions of the laser beams irradiated from the two adjacent laser-irradiating devices are the same in the moving direction of a steel sheet, laser power in the lap portion excessively increases and a melted portion or an oxidized portion is formed. Since such a melted portion or an oxidized portion has an influence on a subsequent etching process, the formation of uniform grooves is hindered. Therefore, it is more preferable that a shift amount in a direction perpendicular to the laser scanning direction between the beam centers is 5% to 95% of the beam diameter.

A melted portion or an oxidized portion is formed in the case that the shift width between laser beam centers (corresponding to the shift amount in FIG. 5(b)) is small, and there is an increase in the amount of a material electrolyzed in the case that the shift width is large. Since the beam diameter is 100 µm or less, it is necessary that the shift width is controlled on the order of micrometers and, therefore, a high-accuracy control be required. However, since positional fluctuation over time occurring in equipment due to a change in an environment surrounding the laser irradiating devices (temperature, humidity, or the like) is inevitable, it is necessary that some adjustment function be introduced. Generally, a beam irradiation position (laser beam center) is controlled by adjusting the angle of a laser deflection mirror as illustrated in FIG. 7(a). However, in the case that the incidence angle of a laser beam with respect to a steel sheet surface increases, the irradiation area of the laser beam on the steel sheet surface increases and the groove width increases. Therefore, it is preferable that the incidence angle of a laser beam with respect to a steel sheet surface is as close to 0° as possible, and, at least, it is necessary that the incidence angle is 20° or less. Therefore, as illustrated in FIG. 7(b), a method in which adjusting the position of a laser deflection mirror (deflection mirror 3 in FIG. 7(b)) by moving the laser deflection mirror back and forth in the laser beam incidence direction onto this mirror is more preferable. This makes it possible to control the position of the laser beam center without increasing the groove width. Moreover, it is preferable that an image taking process of monitoring a resist removal state as a result of laser irradiation is added before the etching process described above. In the case that a desired removal state is not achieved, an adjustment is performed on the basis of the monitoring information to move at least one of the laser deflection mirrors in a laser irradiating device back and forth in the laser beam incidence direction onto the mirror. By using this method, it is possible to control the incidence angle of a laser beam with respect to the steel sheet surface to be 20° or less. Moreover, it is more preferable that this function is automatized and incorporated in a controlling system so as to be implemented online.

When the laser irradiation is performed as described above, since a coated resist in a portion irradiated with a laser beam is removed so as to be made into dust particles or gasified, it is preferable that a dust collector and/or an exhaust gas cleaner, with which the resist is collected by performing air blowing or suction, is installed. However, to prevent defocusing due to steel sheet vibration, it is preferable that an air flow rate, at which air blowing or suction is performed in a treatment tank for laser irradiation, is 100 m$^3$/min or lower. In addition, although there is no particular limitation on the lower limit of the air flow rate, it is preferable that the air flow rate is 10 m$^3$/min or higher.

[Etching Process]

After the laser irradiating process, linear grooves are formed on a steel sheet surface by performing etching. Although any kind of method for etching may be used as long as it is possible to etch a steel sheet, it is preferable to use at least one of a chemical etching method and an electroetching method. It is more preferable to use an electroetching method from the viewpoint of controlling the amount of a material etched. In the case of a chemical etching method, for example, an aqueous solution containing at least one selected from the group consisting of $FeCl_3$, $HNO_3$, HCl, and $H_2SO_4$ may be used as an etching solution. In addition, in the case of an electroetching method, for example, an aqueous solution containing at least one selected from the group consisting of NaCl, KCl, $CaCl_2$, and $NaNO_3$ may be used as an etching solution (electrolytic solution).

In addition, when etching is performed, it is preferable that the etching solution is stirred. By stirring the etching solution, it is possible to perform etching at a higher level of uniformity as a result of eliminating the bias of the temperature and concentration of the electrolytic solution in an etching tank. In addition, as a result of increasing the flow rate of the electrolytic solution in the etching tank, it is also possible to increase etching efficiency. Although there is no particular limitation on the method used for performing the stirring, for example, the stirring may be performed by using a mechanical stirring method or by circulating the etching solution. In the case that a mechanical stirring method is used, it is preferable to use resin stirring members in consideration of resistance to an etching solution. In the case that stirring is performed by circulating the etching solution, for example, an etching solution injection port may be installed in the etching tank so that the etching solution is injected through the injection port by using, for example, a pump.

In the case that etching is performed by using an electroetching method, although a steel sheet may be energized by using any kind of method, for example, direct energization or indirect energization may be performed by using an etching tank of a radial cell-type or a horizontal cell-type. Although electrolytic conditions may be appropriately adjusted in accordance with, for example, a steel sheet to be treated or an electrolytic solution used, for example, a current density may be adjusted to be 1 A/dm$^2$ to 100 A/dm$^2$.

Although the shape of a linear groove formed by performing etching may be controlled by adjusting the shape of a laser beam and etching conditions, it is necessary that the width of a linear groove is 10 μm or more and 100 μm or less, in particular, from the viewpoint of the magnetic properties of a grain-oriented electrical steel sheet. In addition, it is preferable that the depth of a linear groove is 10 μm or more and 40 μm or less.

[Linear Groove Forming Apparatus]

There is no particular limitation on the configuration of the linear groove forming apparatus for forming grooves on a steel sheet according to aspects of the present invention as long as it is possible to perform the processes described above, and an apparatus having any kind of configuration may be used. However, from the viewpoint of productivity, it is preferable to use a continuous linear groove forming apparatus with which it is possible to continuously treat a steel sheet supplied as a coil and, in particular, a grain-oriented electrical steel sheet.

It is preferable that such a continuous linear groove forming apparatus include a deliverer for delivering a steel sheet wound in a coil, a welder for joining the steel sheets delivered from coils with each other, a resist coater for coating a resist to a surface of the steel sheet, a dryer for drying the resist coated to the surface of the steel sheet to form a coated resist, a steel sheet-surface laser irradiator for irradiating laser beams from two or more laser irradiating devices while scanning the laser beams in a direction intersecting the rolling direction of the steel sheet, on which the coated resist is formed, to remove the coated resist from the portion irradiated with the laser beams, an etcher for etching the steel sheet in portions from which the coated resist is removed, a steel sheet-surface resist stripper for stripping the coated resist from the surface of the steel sheet, a cutter for cutting the steel sheet, and a coiler for coiling the steel sheet, arranged in the stated order.

Moreover, it is preferable that the linear groove forming apparatus include a looper for controlling a sheet passing speed in the steel sheet surface laser irradiator to be constant. It is also preferable that the liner groove forming apparatus includes a dust collector and/or an exhaust gas cleaner (that is, one or both selected from a dust collector and an exhaust gas cleaner) for collecting the removed resist which is made into dust particles or gasified due to the laser irradiation.

In addition, it is preferable that each of the laser irradiating devices has at least one laser deflection mirror that directs a laser beam emitted from a laser oscillator to the steel sheet surface. The laser deflection mirror is capable to control a position in the rolling direction of a center of the laser beam by moving a position of the laser deflection mirror back and forth in the laser-beam incidence direction onto the laser deflection mirror.

In addition, it is preferable that the linear groove forming apparatus include an image taking unit for monitoring a resist removal state after the steel sheet-surface laser irradiator and before the etcher. The image taking unit takes an image of resist-removed portions from which the coated resist is removed by performing the laser irradiation. Specifically, the image taking unit takes an image of ends in the laser scanning direction of the resist-removed portions, which is irradiated with laser beams irradiated from the laser irradiating devices adjacent to each other in the sheet transverse direction of the steel sheet to remove the coated resist. In addition, the image taking unit performs monitoring, on the basis of the taken image, to verify that ends in the laser scanning direction of the resist-removed portions are not spaced from each other and the resist-removed portions are not discontinuous or that an overlapped portion of resist-removed portions where the ends overlap each other has a desired shape. For such monitoring, it is preferable that the image taking unit has a monitoring unit. For the monitoring unit, a monitor, an electronic computer, and the like may be used.

In accordance with aspects of the present invention, it is indispensable that the resist-removed portion is formed continuously in the sheet transverse direction of a steel sheet from the viewpoint of magnetic properties. However, in the case that resist removal is performed by using plural laser beams irradiated from plural laser irradiating devices, the state of jointing of portions irradiated with laser beams adjacent to each other changes over time. There may be a case that the resist-removed portion is not formed continuously in the sheet transverse direction of a steel sheet due to the ends in the laser scanning direction of the resist-removed portions are spaced from each other. In such a case, to detect such an abnormal state as soon as possible, it is effective that an image taking unit for monitoring a resist removal state is installed after the steel sheet-surface laser irradiator. It is more preferable to establish a logic to feed back the image diagnosis results of the image taken by the image taking unit to the laser irradiating devices and to automatically perform, for example, synchronous correction, because this makes it possible to correct the setting without stopping the manufacturing line.

Moreover, it is preferable to install a controlling unit for determining, on the basis of the taken image, a shift amount in the overlapped portion of resist-removed portions where the ends in the laser scanning direction of the resist-removed portions overlap each other, feeding back the shift amount to an adjusting unit. The adjusting unit adjusts the position of the laser deflection mirror of the laser irradiating device, and automatically controlling the position of the laser deflection mirror so that the shift amount is within a predetermined range. To perform such control, the laser irradiating device has an adjusting unit including a driving motor or the like for moving the position of a laser deflection mirror back and forth in the laser beam incidence direction onto the laser deflection mirror. In addition, for the controlling unit, an electronic computer and the like may be used.

The reason why it is preferable to install a looper for controlling a sheet passing speed in the steel sheet-surface laser irradiator to be constant is as follows. That is, for example, when welding is performed as described above, in the case that there is a decrease in sheet passing speed in some part of a production line, since there is also a decrease in the sheet passing speed in the steel sheet-surface laser irradiator, there is a temporary increase in irradiation energy. As a result, since there is a variation in groove width obtained, there may be a variation in the iron loss characteristics of a grain-oriented electrical steel sheet. However, by installing a looper for controlling the sheet passing speed to be constant, since it is possible to prevent a variation in sheet passing speed in the steel sheet-surface laser irradiating unit, it is possible to prevent a variation in the magnetic properties of a grain-oriented electrical steel sheet. Here, specifically, it is preferable to install loopers not only between the welder and the resist coater but also between the steel sheet-surface resist remover and the cutter.

EXAMPLES

Hereafter, the present invention will be specifically described in accordance with examples. The examples below are preferable examples of the present invention, and the present invention is not limited by the examples at all. Appropriate alterations may be made to the embodiments of the present invention within a range in accordance with the intent of the present invention, and working examples performed in such a way are all within the technical scope of the present invention.

To evaluate the effect of laser irradiation conditions, linear grooves were formed on the surface of grain-oriented electrical steel sheet under various conditions. Here, a steel slab having a chemical composition containing C: 0.05 mass %, Si: 3.25 mass %, Mn: 0.01 mass %, Al: 0.029 mass %, N: 0.012 mass %, S: 0.005 mass %, and Se: 0.012 mass % with inhibitor forming constituents was subjected to hot rolling and cold rolling by using a common method. Thereby, a cold rolled steel sheet having a thickness of 0.27 mm is obtained, which was used for the grain-oriented electrical steel sheet. Subsequently, a resist ink containing mainly an epoxy resin was coated uniformly across the whole surface of the steel sheet by using a gravure offset printing method. The amount of coating (after drying) of the coated resist was 3.0 g/m$^2$ in terms of total on both sides of the steel sheet.

After the resist was coated, drying was performed at a temperature of 330° C. for 40 seconds, and laser irradiation was then performed under the conditions given in Table 1 while laser scanning was performed in a straight line in the sheet transverse direction of the steel sheet. The laser scanning was repeated cyclically at intervals of 3.5 mm in the rolling direction of the steel sheet. In this experiment, single-mode fiber laser irradiating devices, whose number are given in Table 1, were arranged in the sheet transverse direction of the steel sheet to irradiate a steel sheet having a width of 1120 mm with laser beams. After the laser beam irradiation, the steel sheet surface was observed by using a microscope to determine whether or not a melted portion or an oxidized portion in a portion irradiated with laser beams was recognized. The determination results are collectively given in Table 1. Here, the synchronous timing of the laser irradiating devices was set under plural conditions to prepare samples having various resist-removed portion shapes including continuous shapes and discontinuous shapes.

Subsequently, linear grooves were formed on each of the samples by performing electroetching. An aqueous solution containing NaCl in an amount of 25 mass % for an electrolytic solution is used, and a current density was adjusted in advance so that grooves having a depth of 20 μm were formed on all the samples. Electroetching was performed under the conditions of an electrolytic solution temperature of 20° C., a current density of 4 A/dm$^2$ to 24 A/dm$^2$, and an energizing time of 2 min. After the etching, the resist remaining on the front and back surfaces on the steel sheet was stripped by using a NaOH aqueous solution. The temperature of the NaOH aqueous solution was held to 50° C. to 70° C. Subsequently, rinsing in water and surface washing were performed.

Subsequently, decarburization annealing, final annealing, and the formation of a tension coating were performed under the same conditions on each of all the samples. Thereafter, samples including regions where laser beam joint portion (lap portion) irradiated from laser irradiating devices adjacent to each other in the sheet transverse direction were etched, in the central parts thereof (referred to as "Including Lap portion" in Table 1) were taken. Samples including no such portion (referred to as "Excluding Lap portion" in Table 1) were also taken. Then, the iron loss $W_{17/50}$ of each of the taken samples was determined. The determined results are given in Table 1.

As indicated by the results given in Table 1, it was clarified that, in each of the samples where the linear groove formation method in the range according to aspects of the present invention was used, it was possible to suppress the formation of a melted portion and an oxidized portion and to form narrow, deep linear grooves having a uniform shape. As a result, there was an improvement in iron loss compared with the case of the samples out of the range of the present invention. It was further clarified that, in the samples including an etched lap portion (referred to as "Including Lap portion" in Table 1), in particular, in the samples having a shift ratio of 5% to 95% with respect to a beam diameter, it was possible to achieve satisfactory iron loss at the same level as that of the samples including no etched lap portion (referred to as "Excluding Lap portion" in Table 1).

TABLE 1

| No. | Number of Laser Irradiating Devices | Scanning Speed (m/sec) | Irradiation Energy (J/m) | Beam Diameter (μm) | Incidence Angle of Laser Beam with Respect to Steel Sheet Surface (°) | Shit Ratio (%) [(Shift Amount/Beam Diameter) × 100 | with or without Melted Portion or Oxidized Portion | Iron Loss $W_{17/50}$ (W/kg) Excluding Lap Portion | Iron Loss $W_{17/50}$ (W/kg) Including Lap Portion | Note |
|---|---|---|---|---|---|---|---|---|---|---|
| 1 | 2 | 10 | 10 | 8 | 0 | 0 | with (Only Lap Portion) | 0.85 | 0.85 | Comparative Example |
| 2 | 2 | 10 | 10 | 30 | 0 | 0 | with (Only Lap Portion) | 0.78 | 0.79 | Example |
| 3 | 2 | 10 | 10 | 30 | 30 | 0 | with (Only Lap Portion) | 0.83 | 0.84 | Comparative Example |
| 4 | 2 | 10 | 60 | 30 | 0 | 0 | with*1 | 0.82 | 0.83 | Comparative Example |
| 5 | 2 | 10 | 5 | 70 | 5 | 15 | without | 0.78 | 0.78 | Example |
| 6 | 2 | 10 | 5 | 70 | 25 | 15 | without | 0.83 | 0.83 | Comparative Example |
| 7 | 2 | 10 | 5 | 70 | 0 | 100 | without | 0.78 | 0.79 | Example |
| 8 | 2 | 10 | 10 | 120 | 0 | 0 | with (Only Lap Portion) | 0.82 | 0.83 | Comparative Example |
| 9 | 2 | 10 | 20 | 120 | 0 | 15 | without | 0.82 | 0.82 | Comparative Example |
| 10 | 3 | 60 | 10 | 40 | 15 | 0 | with (Only Lap Portion) | 0.78 | 0.79 | Example |
| 11 | 3 | 60 | 10 | 40 | 15 | 45 | without | 0.78 | 0.78 | Example |
| 12 | 3 | 60 | 50 | 40 | 0 | 0 | with*1 | 0.82 | 0.83 | Comparative Example |
| 13 | 3 | 60 | 15 | 80 | 40 | 50 | without | 0.82 | 0.82 | Comparative Example |
| 14 | 3 | 60 | 15 | 80 | 0 | 50 | without | 0.78 | 0.78 | Example |
| 15 | 3 | 60 | 5 | 160 | 0 | 0 | with (Only Lap Portion) | 0.83 | 0.84 | Comparative Example |
| 16 | 3 | 60 | 25 | 160 | 0 | 50 | without | 0.83 | 0.83 | Comparative Example |
| 17 | 4 | 150 | 10 | 60 | 0 | 0 | with (Only Lap Portion) | 0.78 | 0.79 | Example |
| 18 | 4 | 150 | 40 | 60 | 0 | 0 | with*1 | 0.82 | 0.83 | Comparative Example |
| 19 | 4 | 150 | 20 | 100 | 0 | 0 | with (Only Lap Portion) | 0.78 | 0.79 | Example |
| 20 | 4 | 150 | 20 | 100 | 0 | 90 | without | 0.78 | 0.78 | Example |
| 21 | 4 | 150 | 20 | 200 | 0 | 0 | with (Only Lap Portion) | 0.83 | 0.84 | Comparative Example |
| 22 | 4 | 150 | 20 | 200 | 0 | 90 | without | 0.83 | 0.83 | Comparative Example |

Underlined items indicate items out of the ranges of the present invention.
*1 with a melted portion or an oxidized portion in lap portion and in resist-removed portions other than the lap portion

REFERENCE SIGNS LIST

1 to 3 deflection mirror
4 laser oscillator
5, 6 laser irradiating device
7 resist-removed portion
8 overlapped portion of resist-removed portions

The invention claimed is:

1. A linear groove formation method comprising:
   a resist forming process of forming a coated resist on a surface of a steel sheet;
   a laser irradiating process of irradiating laser beams onto the steel sheet while repeating a laser scanning in a direction intersecting a rolling direction of the steel sheet cyclically in the rolling direction of the steel sheet to remove the coated resist in portions irradiated with the laser beams; and
   an etching process of forming linear grooves by etching portions of the steel sheet from which the coated resist is removed,
   wherein, in the laser irradiating process:
   the coated resist is removed by using two or more laser irradiating devices; and
   an irradiation energy, a beam diameter in a direction perpendicular to a laser scanning direction, and an incidence angle with respect to the surface of the steel sheet of the laser beams irradiated from respective ones of the laser irradiating devices are lower than 30 J/m, 10 μm or more and 100 μm or less, and 20° or less, respectively;

wherein the laser irradiating process includes shifting centers of two of the laser beams irradiated onto the surface of the steel sheet from respective ones of the laser irradiating devices arranged adjacent to each other in a sheet transverse direction of the steel sheet by 5% to 95% of the beam diameter in the direction perpendicular to the laser scanning direction while forming a lap portion where laser beams irradiated from the two laser irradiating devices arranged adjacent to each other in the sheet transverse direction of the steel sheet overlap each other.

2. A method for manufacturing a grain-oriented electrical steel sheet, the method comprising forming linear grooves on a surface of a grain-oriented electrical steel sheet by using the linear groove formation method according to claim 1.

3. The linear groove formation method according to claim 1, wherein:
   each of the laser irradiating devices has at least one laser deflection mirror for directing a corresponding one of the laser beams emitted from a laser oscillator to the surface of the steel sheet; and
   a position of the center of the corresponding one of the laser beams is controlled by moving a position of the laser deflection mirror back and forth in a laser beam incidence direction onto the laser deflection mirror.

4. The linear groove formation method according to claim 3, further comprising:
   an image taking process of taking an image of resist-removed portions from which the coated resist is removed by irradiating the surface of the steel sheet with the laser beams, between the laser irradiating process and the etching process, wherein, in the image taking process, the image is taken at ends in the laser scanning direction of the resist-removed portions irradiated with the laser beams from respective ones of the laser irradiating devices arranged adjacent to each other in the sheet transverse direction of the steel sheet to remove the coated resist;
   measuring, on a basis of the taken image, a shift amount in an overlapped portion of the resist-removed portions where the ends overlap each other; and
   feeding back the shift amount to an adjusting unit for automatically controlling the position of the laser deflection mirror to adjust the position of the laser deflection mirror of the laser irradiating device so that the shift amount is within a predetermined range.

5. A method for manufacturing a grain-oriented electrical steel sheet, the method comprising forming linear grooves on a surface of a grain-oriented electrical steel sheet by using the linear groove formation method according to claim 4.

6. A method for manufacturing a grain-oriented electrical steel sheet, the method comprising forming linear grooves on a surface of a grain-oriented electrical steel sheet by using the linear groove formation method according to claim 3.

7. The linear groove formation method according to claim 1, the method further comprising:
   an image taking process of taking an image of resist-removed portions from which the coated resist is removed by irradiating the surface of the steel sheet with the laser beams, between the laser irradiating process and the etching process,
   wherein, in the image taking process, the image is taken at ends in the laser scanning direction of the resist-removed portions irradiated with the laser beams from respective ones of the laser irradiating devices arranged adjacent to each other in the sheet transverse direction of the steel sheet to remove the coated resist.

8. The linear groove formation method according to claim 7, further comprising:
   monitoring, on a basis of the taken image, to verify that the ends in the laser scanning direction of the resist-removed portions are not spaced from each other and the resist-removed portions are not discontinuous or that an overlapped portion of the resist-removed portions where the ends overlap each other has a desired shape.

9. A method for manufacturing a grain-oriented electrical steel sheet, the method comprising forming linear grooves on a surface of a grain-oriented electrical steel sheet by using the linear groove formation method according to claim 8.

10. A method for manufacturing a grain-oriented electrical steel sheet, the method comprising forming linear grooves on a surface of a grain-oriented electrical steel sheet by using the linear groove formation method according to claim 7.

11. A linear groove forming apparatus used for the linear groove formation method according to claim 1, the apparatus comprising:
   a deliverer for delivering a steel sheet wound in a coil;
   a welder for joining steel the sheet delivered from the coil with each other;
   a resist coater for coating a resist on a surface of the steel sheet;
   a dryer for drying the resist coated on the surface of the steel sheet to form a coated resist;
   a steel sheet-surface laser irradiator for irradiating laser beams onto the surface of the steel sheet from respective ones of two or more laser irradiating devices arranged adjacent to each other in the sheet transverse direction of the steel sheet while scanning the laser beams in a direction intersecting a rolling direction of the steel sheet, on which the coated resist is formed, to remove the coated resist from portions irradiated with the laser beams, including shifting centers of two of the laser beams irradiated onto the surface of the steel sheet from respective ones of the laser irradiating devices arranged adjacent to each other by 5% to 95% of the beam diameter in the direction perpendicular to the laser scanning direction while forming a lap portion where laser beams irradiated from the two laser irradiating devices arranged adjacent to each other in the sheet transverse direction of the steel sheet overlap each other;
   an etcher for etching the steel sheet in portions from which the coated resist is removed;
   a steel sheet-surface resist stripper for stripping the coated resist from the surface of the steel sheet;
   a cutter for cutting the steel sheet; and
   a coiler for coiling the steel sheet,
   arranged in the stated order.

12. The linear groove forming apparatus according to claim 11, the apparatus further comprising:
   a looper for controlling a sheet passing speed in the steel sheet-surface laser irradiator to be constant; and
   a dust collector and/or an exhaust gas cleaner for collecting the coated resist which is made into dust particles or gasified due to irradiation with the laser beams.

13. A linear groove forming apparatus used for the linear groove formation method according to claim 3, the apparatus comprising:
   a deliverer for delivering a steel sheet wound in a coil;
   a welder for joining the steel sheet delivered from the coil with each other;

a resist coater for coating a resist on a surface of the steel sheet;

a dryer for drying the resist coated on the surface of the steel sheet to form a coated resist;

a steel sheet-surface laser irradiator for irradiating laser beams onto the surface of the steel sheet from respective ones of two or more laser irradiating devices arranged adjacent to each other in the sheet transverse direction of the steel sheet while scanning the laser beams in a direction intersecting a rolling direction of the steel sheet, on which the coated resist is formed, to remove the coated resist from portions irradiated with the laser beams, including shifting centers of two of the laser beams irradiated onto the surface of the steel sheet from respective ones of the laser irradiating devices arranged adjacent to each other by 5% to 95% of the beam diameter in the direction perpendicular to the laser scanning direction while forming a lap portion where laser beams irradiated from the two laser irradiating devices arranged adjacent to each other in the sheet transverse direction of the steel sheet overlap each other;

an etcher for etching the steel sheet in portions from which the coated resist is removed;

a steel sheet-surface resist stripper for stripping the coated resist from the surface of the steel sheet;

a cutter for cutting the steel sheet; and a coiler for coiling the steel sheet, arranged in the stated order, wherein:

each of the laser irradiating devices has at least one laser deflection mirror for directing a corresponding one of the laser beams emitted from a laser oscillator to the surface of the steel sheet capable to control a position of a center of the corresponding one of the laser beams by moving a position of the laser deflection mirror back and forth in a laser beam incidence direction onto the laser deflection mirror.

14. The linear groove forming apparatus according to claim 13, the apparatus further comprising:

a looper for controlling a sheet passing speed in the steel sheet-surface laser irradiator to be constant; and a dust collector and/or an exhaust gas cleaner for collecting the coated resist which is made into dust particles or gasified due to irradiation with the laser beams.

15. A linear groove forming apparatus used for the linear groove formation method according to claim 7, the apparatus comprising:

a deliverer for delivering a steel sheet wound in a coil;

a welder for joining the steel sheet delivered from the coil with each other;

a resist coater for coating a resist on a surface of the steel sheet;

a dryer for drying the resist coated on the surface of the steel sheet to form a coated resist;

a steel sheet-surface laser irradiator for irradiating laser beams onto the surface of the steel sheet from respective ones of two or more laser irradiating devices arranged adjacent to each other in the sheet transverse direction of the steel sheet while scanning the laser beams in a direction intersecting a rolling direction of the steel sheet, on which the coated resist is formed, to remove the coated resist from portions irradiated with the laser beams, including shifting centers of two of the laser beams irradiated onto the surface of the steel sheet from respective ones of the laser irradiating devices arranged adjacent to each other by 5% to 95% of the beam diameter in the direction perpendicular to the laser scanning direction while forming a lap portion where laser beams irradiated from the two laser irradiating devices arranged adjacent to each other in the sheet transverse direction of the steel sheet overlap each other;

an etcher for etching the steel sheet in portions from which the coated resist is removed;

a steel sheet-surface resist stripper for stripping the coated resist from the surface of the steel sheet;

a cutter for cutting the steel sheet; and a coiler for coiling the steel sheet, arranged in the stated order, and the apparatus further comprising:

an image taking unit for taking an image of resist-removed portions from which the coated resist is removed by irradiating the laser beams, wherein the image taking unit takes an image of ends in the laser scanning direction of the resist-removed portions irradiated with the laser beams from respective ones of the laser irradiating devices arranged adjacent to each other in the sheet transverse direction of the steel sheet to remove the coated resist.

16. The linear groove forming apparatus according to claim 15, the apparatus further comprising:

a looper for controlling a sheet passing speed in the steel sheet-surface laser irradiator to be constant; and a dust collector and/or an exhaust gas cleaner for collecting the coated resist which is made into dust particles or gasified due to irradiation with the laser beams.

17. A linear groove forming apparatus used for the linear groove formation method according to claim 8, the apparatus comprising:

a deliverer for delivering a steel sheet wound in a coil;

a welder for joining the steel sheet delivered from the coil with each other;

a resist coater for coating a resist on a surface of the steel sheet;

a dryer for drying the resist coated on the surface of the steel sheet to form a coated resist;

a steel sheet-surface laser irradiator for irradiating laser beams onto the surface of the steel sheet from respective ones of two or more laser irradiating devices arranged adjacent to each other in the sheet transverse direction of the steel sheet while scanning the laser beams in a direction intersecting a rolling direction of the steel sheet, on which the coated resist is formed, to remove the coated resist from portions irradiated with the laser beams, including shifting centers of two of the laser beams irradiated onto the surface of the steel sheet from respective ones of the laser irradiating devices arranged adjacent to each other by 5% to 95% of the beam diameter in the direction perpendicular to the laser scanning direction while forming a lap portion where laser beams irradiated from the two laser irradiating devices arranged adjacent to each other in the sheet transverse direction of the steel sheet overlap each other;

an etcher for etching the steel sheet in portions from which the coated resist is removed;

a steel sheet-surface resist stripper for stripping the coated resist from the surface of the steel sheet;

a cutter for cutting the steel sheet; and a coiler for coiling the steel sheet, arranged in the stated order, and the apparatus further comprising:

an image taking unit for taking an image of resist-removed portions from which the coated resist is removed by irradiating the laser beams, wherein:

the image taking unit takes an image of ends in the laser scanning direction of the resist-removed portions irradiated with the laser beams from respective ones of the laser irradiating devices arranged adjacent to each other in the sheet transverse direction of the steel sheet to remove the coated resist; and the image taking unit has a monitoring unit for monitoring, on a basis of the taken image, to verify that ends in the laser scanning direction of the resist-removed portions are not spaced from each other and the resist-removed portions are not discontinuous or that an overlapped portion of the resist-removed portions where the ends overlap each other has a desired shape.

18. The linear groove forming apparatus according to claim 17, the apparatus further comprising:
a looper for controlling a sheet passing speed in the steel sheet-surface laser irradiator to be constant; and
a dust collector and/or an exhaust gas cleaner for collecting the coated resist which is made into dust particles or gasified due to irradiation with the laser beams.

19. A linear groove forming apparatus used for the linear groove formation method according to claim 4, the apparatus comprising:
a deliverer for delivering a steel sheet wound in a coil;
a welder for joining the steel sheet delivered from the coil with each other;
a resist coater for coating a resist on a surface of the steel sheet;
a dryer for drying the resist coated on the surface of the steel sheet to form a coated resist;
a steel sheet-surface laser irradiator for irradiating laser beams onto the surface of the steel sheet from respective ones of two or more laser irradiating devices arranged adjacent to each other in the sheet transverse direction of the steel sheet while scanning the laser beams in a direction intersecting a rolling direction of the steel sheet, on which the coated resist is formed, to remove the coated resist from portions irradiated with the laser beams, including shifting centers of two of the laser beams irradiated onto the surface of the steel sheet from respective ones of the laser irradiating devices arranged adjacent to each other by 5% to 95% of the beam diameter in the direction perpendicular to the laser scanning direction while forming a lap portion where laser beams irradiated from the two laser irradiating devices arranged adjacent to each other in the sheet transverse direction of the steel sheet overlap each other;
an etcher for etching the steel sheet in portions from which the coated resist is removed;
a steel sheet-surface resist stripper for stripping the coated resist from the surface of the steel sheet;
a cutter for cutting the steel sheet; and
a coiler for coiling the steel sheet,
arranged in the stated order, wherein:
each of the laser irradiating devices has at least one laser deflection mirror for directing a corresponding one of the laser beams emitted from a laser oscillator to the surface of the steel sheet capable to control a position of a center of the corresponding one of the laser beams by moving a position of the laser deflection mirror back and forth in a laser beam incidence direction onto the laser deflection mirror, the apparatus further comprising:
an image taking unit for taking an image of resist-removed portions from which the coated resist is removed by irradiating the laser beams, wherein the image taking unit takes an image of ends in the laser scanning direction of the resist-removed portions irradiated with the laser beams from respective ones of the laser irradiating devices arranged adjacent to each other in the sheet transverse direction of the steel sheet to remove the coated resist; and
a controlling unit for determining, on a basis of the taken image, a shift amount in an overlapped portion of the resist-removed portions where the ends overlap each other, feeding back the shift amount to an adjusting unit that adjusts the position of the laser deflection mirror of the laser irradiating device, and automatically controlling the position of the laser deflection mirror so that the shift amount is within a predetermined range.

20. The linear groove forming apparatus according to claim 19, the apparatus further comprising:
a looper for controlling a sheet passing speed in the steel sheet-surface laser irradiator to be constant; and
a dust collector and/or an exhaust gas cleaner for collecting the coated resist which is made into dust particles or gasified due to irradiation with the laser beams.

* * * * *